US012566721B2

(12) United States Patent
Lee

(10) Patent No.: US 12,566,721 B2
(45) Date of Patent: Mar. 3, 2026

(54) SYSTEM SEMICONDUCTOR WITH MULTI PROJECT CHIP FOR PROTECTING INTELLECTUAL PROPERTY RIGHT OF THE SYSTEM SEMICONDUCTOR AND THE METHOD THEREOF

(71) Applicant: NEOWINE Co., Ltd., Seongnam-si (KR)

(72) Inventor: Hyo Seung Lee, Seongnam-si (KR)

(73) Assignee: NEOWINE Co., Ltd., Seongnam-si (KR)

( * ) Notice: Subject to any disclaimer, the term of this patent is extended or adjusted under 35 U.S.C. 154(b) by 116 days.

(21) Appl. No.: 18/396,683

(22) Filed: Dec. 26, 2023

(65) Prior Publication Data

US 2025/0209024 A1    Jun. 26, 2025

(51) Int. Cl.
  G06F 13/40        (2006.01)
  G06Q 50/18        (2012.01)
(52) U.S. Cl.
  CPC ....... G06F 13/4004 (2013.01); G06Q 50/184 (2013.01)
(58) Field of Classification Search
  CPC .. G06F 13/4004; G06F 30/33; G06F 2115/02; G06F 2115/08; G06Q 50/184

USPC ......................................................... 726/25
See application file for complete search history.

(56) References Cited

U.S. PATENT DOCUMENTS

2006/0015947 A1 *    1/2006   Conti .................. G06F 12/1433
                                                              711/E12.1
2014/0012596 A1 *    1/2014   Kim ........................ G06F 21/32
                                                                  705/3
2017/0039352 A1 *    2/2017   Volkening ............... G06F 21/57
2021/0326489 A1 *   10/2021   Kee ..................... G06F 12/0638

FOREIGN PATENT DOCUMENTS

CN            114970409 A  *  8/2022  ............. G06F 30/33

* cited by examiner

*Primary Examiner* — Kambiz Zand
*Assistant Examiner* — Lawrence Q Truong
(74) *Attorney, Agent, or Firm* — Harvest IP LAW LLP

(57)            ABSTRACT

A system semiconductor according to the present invention may include a common die including one or more components; and a special die having one or more components, wherein the common die may include a first chiplet that interfaces between one or more components provided in the common die and one or more components provided in the special die, and the special die may include a second chiplet interface unit that implements an interface between one or more components provided in the special die and one or more components provided in the common die.

8 Claims, 7 Drawing Sheets

SYSTEM SEMICONDUCTOR WITH MULTI PROJECT CHIP FOR PROTECTING INTELLECTUAL PROPERTY RIGHT OF THE SYSTEM SEMICONDUCTOR AND THE METHOD THEREOF

NATIONAL R&D PROJECT INFORMATION

This invention was made with government support under project number and the following:

[Project No.] 1711193508

[Name of Government Department] Institute of Information & communications Technology Planning & Evaluation (IITP)

[Project Management Organization Name] IITP

[Research Business Name] PIM Innovation-Based Technology

[Research Project Name] Data Flow Structure based PIM Execution and Programming Model Development

[contribution rate] 1:1

[Project implementation Organization Name] NEOWINE

[Total Project Period] Apr. 1, 2022~Dec. 31, 2025

[This Year Project Period] Jan. 1, 2023~Dec. 31, 2023

TECHNICAL FIELD

The present invention relates to a multi-project chip, and more specifically, a system semiconductor and a driving method therefor that can reduce the overall development cost by separating a large number of components constituting a system semiconductor into one or more dies comprising one or more components that require a high development cost and one or more components requiring low development costs.

BACKGROUND OF INVENTION

A multi-project wafer semiconductor manufacturing arrangement (hereinafter referred to as MPW array) refers to a semiconductor wafer and its manufacturing methods that include products (e.g., chips) produced by a number of different designs or projects by sharing masks and wafers by multiple customers.

The MPW chip produced by the above MPW arrangement can be considered a composite of chips having a number of different designs, and such composite chips can be repeatedly arrayed/produced throughout the wafer.

By using the MPW array, it is possible to share the cost of verifying or testing the technicality or efficiency of a new product having a new structure, a new process, a new topology, etc., and to minimize or reduce the cost.

In general, a product (i.e., a chip) desired by an orderer is repeatedly arranged on a wafer in the same or different sizes. FIG. 1 illustrates a regular arrangement of 10 new chips of different orderers on the wafer. Such a structure corresponds to the case where 10 different chips required by 10 orderers are manufactured.

In this case, the client was able to concentrate on the development of a new product while paying intellectual property(IP) royalty for the required processes by outsourcing while reducing initial development costs by using the MPW array.

However, due to the miniaturization of the semiconductor process, there was a problem that IP royalties increased exponentially compared to the initial development. In order to solve this problem, it is possible for the orderers to develop the IP themselves, but the development and verification cost for this is very high, so there was a limit to developing the IP directly.

In addition, the orderer has to pay for the layout and backend for semiconductor design. As the semiconductor process is refined, the cost of layout and backend to transform logical designs into physical designs has increased.

A technology to solve this problem is the Korean Patent Application No. 10-2022-0101919 filed by the applicant. It discloses a multi-project chip comprising two or more individual units that can be selectively driven by each of two or more orderers, and one or more common units that can be driven together with said individual units, and how to manufacture and use them.

In this way, the applicant constructs a multi-project chip with individual units that are optionally configured according to the request of the orderers and a common unit that runs together with the individual units, and allows each orderer to pay IP royalties, i.e., usage fees only for the components he or she intends to use, and efforts are being made to utilize the above-mentioned multi-project chip technology.

Related Document(s)

Patent Document

Korean Patent Application No. 10-2022-0101919, filed on Aug. 16, 2022,

EMBODIMENTS OF THE INVENTION

Problems to be Solved

According to the present invention, a system semiconductor is constituted by separating a plurality of components constituting the system semiconductor into one or more dies including one or more components requiring a large amount of development costs and one or more dies including one or more components requiring low development costs. Therefore, the purpose of this program is to provide system semiconductors and driving methods that can reduce overall development costs by allowing them to be reused for each development of system semiconductors that require a high development cost.

In addition, the other purpose of the present invention is to provide a system semiconductor and a driving method therefor that enables the management of intellectual property rights to be carried out for each die by selectively enabling only the components for which intellectual property rights have been granted among the components contained in each of the multiple dies that make up a system semiconductor, thereby reducing the development cost of the customer and protecting the intellectual property rights.

Means for Solving Problems

A system semiconductor according to the present invention to achieve the above purpose is a common die composed of one or more components; and a special die having one or more of the above components; the common die may include a first chiplet interface unit that performs an interface between one or more components provided in the common die and one or more components provided in the special die, and the special die may include a second chiplet interface unit that performs the interface between one or more components provided in the special die and one or more components provided in the common die.

Effect of the Invention

The present invention separates a number of components that make up a system semiconductor into one or more dies that include one or more components that require high development costs and one or more dies that include one or more components that require low development costs. By configuring semiconductors, die among system semiconductors that require high development costs can be reused during development, thereby reducing and minimizing overall development costs.

In addition, the present invention selectively may enable the management of intellectual property rights to be carried out for each die by selectively enabling only the components contained in each of the multiple dies that make up the system semiconductor, thereby reducing the development cost for the customer and protecting the intellectual property rights.

In addition, the present invention selectively enables a chipset interface method that matches the enabled components for each of the plurality of dies constituting the system semiconductor, so as to meet the purpose of developing a system semiconductor composed of separate dies. It provides an effect of improving the performance of system semiconductors by enabling them to operate.

DETAILED EMBODIMENTS

Figure 1:
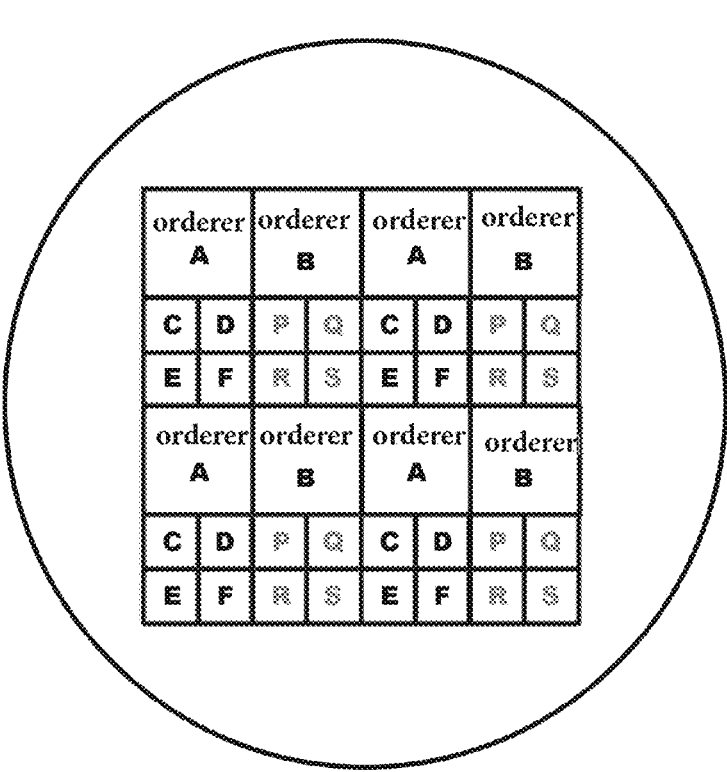
FIG. 1 is an example in which a plurality of orderers have produced a plurality of chips by each project in a single wafer using a known MPW array.

A system semiconductor is formed by separating the multiple components that make up a system semiconductor into one or more dies containing one or more components that require high development costs and one or more dies that contain one or more components that require low development costs. Thus, dies that require high development costs among system semiconductors can be reused during development, thereby reducing overall development costs.

According to an aspect of the present invention, among the components contained in each of the multiple dies that make up the system semiconductor, only those components that have been granted intellectual property rights are selectively enabled, enabling intellectual property management to be carried out for each die, thereby reducing the development cost of customers and protecting intellectual property rights.

The system semiconductor according to the present invention and the driving method thereof are described in detail with reference to the drawing.

The term "orderer" in this specification generally refers to a fabless company that can design chips but does not have the facilities to produce them.

The term "manufacturer" of the present specification generally refers to a company capable of actually producing an MP-chip of the present invention, for example, a foundry. However, the "orderer" in this specification may include "manufacturer".

In addition, the term "other company" in this specification means a company that supplies an H/W element or an S/W element necessary for the production of the MP-chip of the present invention to an orderer or manufacturer. For example, a company that provides services related to EDA (electronic design automation) tools or other processes required for MP-chip production is an example of a "third party."

However, in order for the orderer or the manufacturer to use various H/W elements or S/W elements provided by "other companies", it may be necessary to purchase the elements from "other companies" or to obtain permission such as a license to drive the elements.

First Embodiment

Configuration of System Semiconductor

Figure 2:
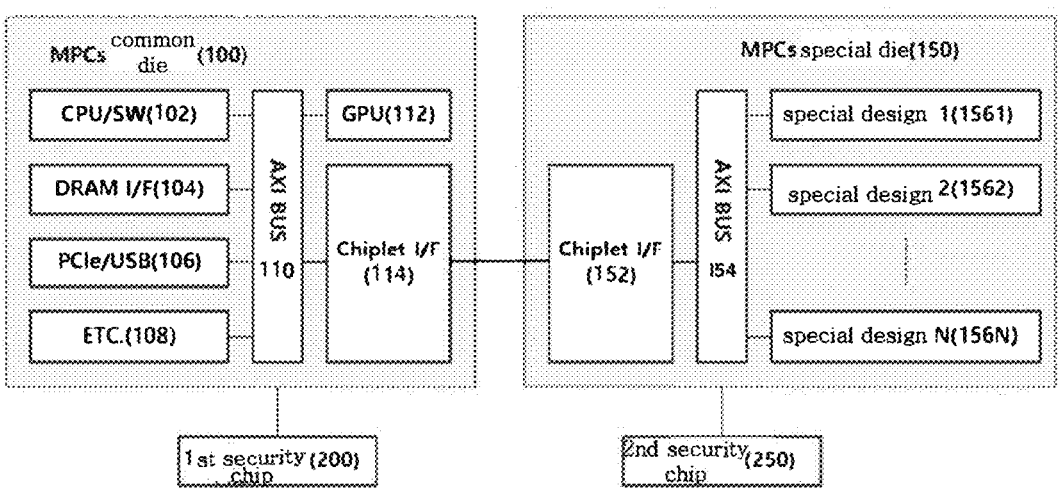
FIG. 2 is a configuration diagram of a system semiconductor according to a first preferred embodiment of the present invention.

FIG. 2 shows the configuration of the system semiconductor according to an embodiment of the present invention. Referring to FIG. 2, the system semiconductor may include MPCs (Multi Project Chip by security) common die 100, MPCs special die 150, the first security chip 200 for MPCs common die 100, and the second security chip 250 for MPCs special die 150.

The MPC common die 100 may include one or more components that require high development costs, such as Central processing unit(CPU)/SW 102, DRAM I/F 104, peripheral component interconnect express (PCIe), universal serial bus (USB) 106, etc. 108, AXI BUS 110, GPU 112, and Chiplet I/F 114.

Components included in the MPC common die 100 are selected if the component requires a high development cost. Here, the components may be configured in various ways depending on the intention of the designer of the MPCs common die 100.

The first security chip 200 selectively enables some of the components provided in the MPC common die 100 and disables the rest according to component setting information preset to match different intellectual property rights grant information for each customer. By enabling this, only the components that are permitted to use intellectual property rights, rather than all components provided in the MPC common die 100, are selectively driven.

The MPCs special die 150 may include chiplet I/F 152, AXI BUS 154, and special design 1~N (1561~156N).

The components provided in the MPC special die 150 are selected to be components that are judged to require low development costs. Here, the above components can be configured in various ways according to the intention of the designer of the MPCs special die 100, and this is apparent to those skilled in the art by the present invention.

The second security chip 250 may selectively enable some of the components provided in the MPC special die 150 and others according to component setting information preset to match different intellectual property rights grant information for each customer. By disabling it, only the components for which intellectual property rights are permitted are selectively driven, not all components included in the MPC special die 100.

The MPCs common die 100 and the MPCs special die 150 are provided in chiplet I/F 114, 152 for the MPCs common die 100 and the MPCs special die 150 for use in various applications.

One or more of the communication type interfaces may be employed as the above Chiplet I/Fs 114, 152, such as General-Purpose Input/Output (GPIO), Serializer/Deserializer (SerDes), Universal Chiplet Interconnect Express (UCIe), peripheral component interconnect express (PCIe), universal serial bus (USB), IEEE1394, serial bus architecture for high-speed data transfer, FireWire is a serial bus, meaning that information is transferred one bit at a time, and Transmission Control Protocol/Internet Protocol (TCP/IP)

When the Chiplet I/F 114, 152 is equipped with multiple communication method interfaces, the first and second security chips 200, 250 may detect the communication method corresponding to the components permitted to be used, by selectively enabling the chiplet interface corresponding to the detected communication method and disabling the others, the MPC common die 100, which can be used for various purposes, can perform communication in a communication method suitable for the purpose.

That is, if the purpose of use of the system semiconductor requires low-speed communication, General-Purpose Input/Output (GPIO), if high-speed communication is required, Serializer/Deserializer (SerDes), and if general-purpose high-speed communication is required, Universal Chiplet Interconnect Express (UCIe) is optionally enabled to implement the chiplet interface.

In addition, the first security chip 200 verifies the communication method of the chiplet interface provided on the MPCs special die 150 through the chiplet interface provided on the MPCs common die 100, and the chiplet interface may be enabled using a communication method that matches the communication method of the provided chiplet interface.

In FIG. 2 above, it is illustrated that the system semiconductor includes only one MPCs common die 100 and one MPCs special die 150. However, according to the intention of the designer of the system semiconductor, the system semiconductor may include one or more common die and one or more special die. In this case, the security chip can be independently equipped for each die.

However, it is not limited thereto.

In addition, although only hardware components of the system semiconductor are shown in FIG. 2, software mounted on the hardware is also a component that is enabled and disabled by the security chip, and this is obvious to those skilled in the art according to the present invention.

Since the composition and operation of the first and second security chips are the same, the following describes the configuration and operation of only one security chip.

Configuration of Security Chip

Figure 3:
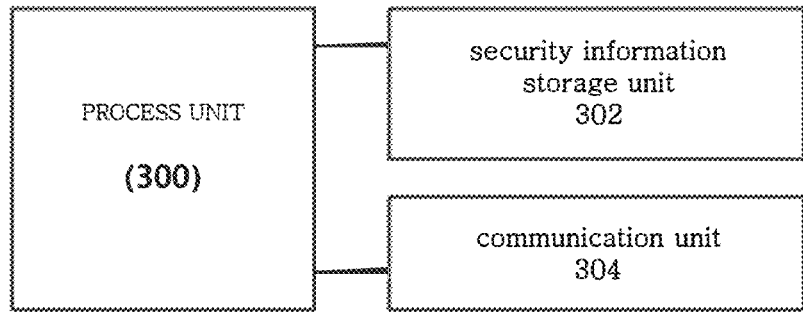
FIG. 3 is a configuration diagram of a security chip according to a first preferred embodiment of the present invention.

FIG. 3 illustrates a configuration of a security chip according to a preferred first embodiment of the present invention. Referring to FIG. 3, the security chip may include a process unit 300, a security information storage unit 302, and a communication unit 304.

The process unit 300 performs a security function in accordance with the preferred first embodiment of the present invention and controls each component of the security chip. To further explain the operation of the process unit 500, the process unit 500 may read the pre-stored component setting information for one or more of the MPCs common die and MPCs special die, and enable at least one component corresponding to the read component setting information, and disable the other component.

The enable or disable for the component may provide or block a clock for the component, provide or block power for the component, provide or do not provide a predetermined signal or password to the component, or activate or deactivate a bus interface for the component according to an aspect of the present invention.

The security information storage unit 302 may store various information such as a processing program of the process unit 300, and in particular, component setting information according to a preferred first embodiment of the present invention. The component setting information is the identifying information about the components in which the use of the intellectual property right is allowed by the user among components included in the die which oneself takes charge of the setting information for the component disabled and the component enabled.

The communication unit 304 may perform communication or signal processing with the process unit 300 and one or more dies.

Now, the operation method of the system semiconductor applicable to the system semiconductor described above will be explained with reference to drawings.

Driving Procedure of System Semiconductors

Figure 4:
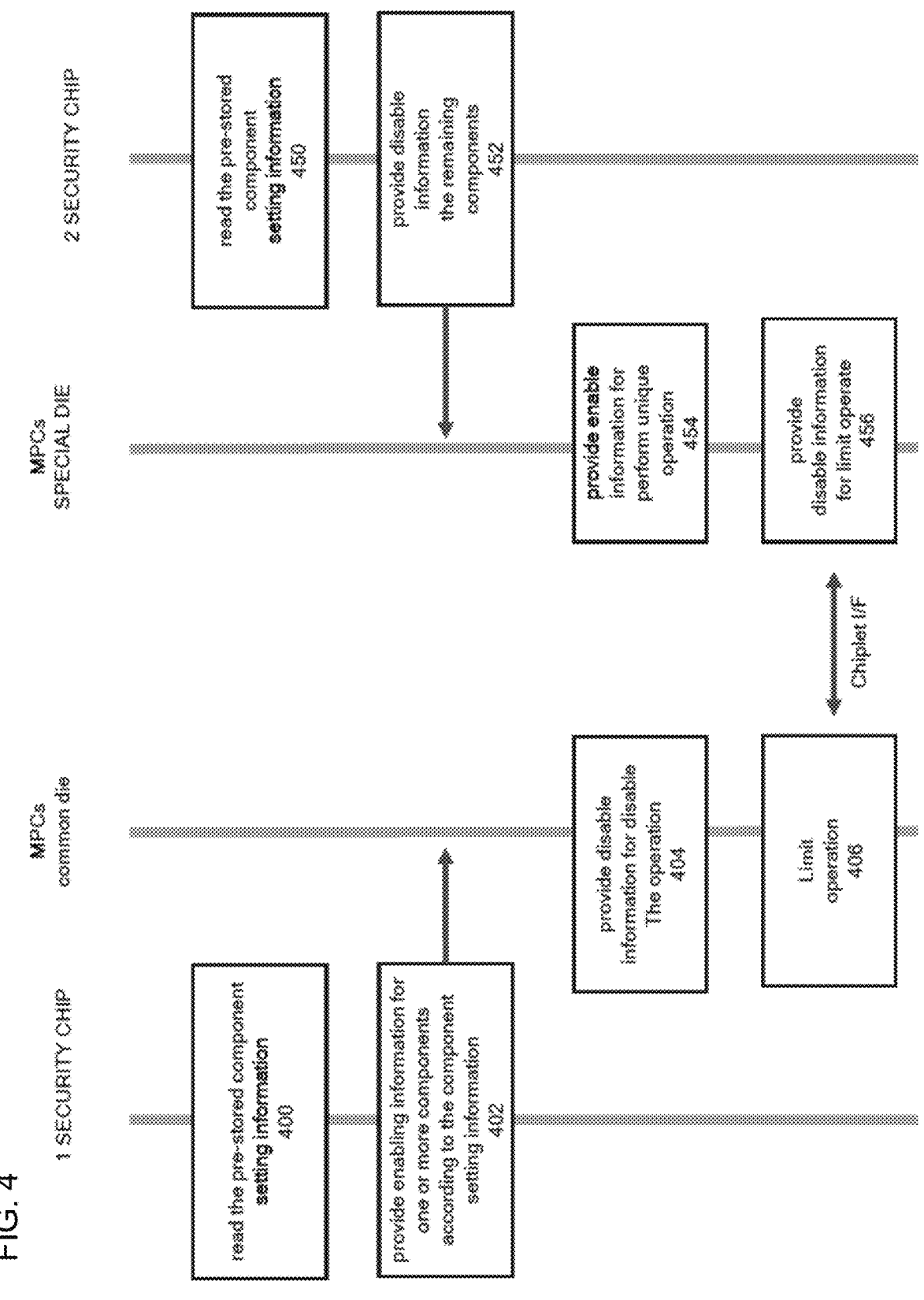
FIG. 4 is a driving procedure diagram of a system semiconductor according to a first embodiment of the present invention.

FIG. 4 shows the driving procedure of the system semiconductor according to the preferred first embodiment of the present invention. Referring to the FIG. 2, the first security chip 200 may read the pre-stored component setting information for the MPCs common die 100 when an event such as power on occurs S400. Thereafter, the first security chip 200 may provide enabling information for one or more components according to the component setting information for MPCs common die 100 S402 and provide disable information for the remaining components. Each component of the MPCs common die 100 provided with the enabling information may be enabled and operated to perform its own unique function, and when necessary to perform the unique function of the enable, the each component of the MPCs common die 100 may perform communication with the components of the MPCs special die 150 through the chiplet interface, and the each component of the MPCs common die 100 provided with the disable information may be disabled and the operation may be limited steps 404, 406.

And the second security chip 250 may read the pre-stored component setting information for the MPCs special die 150 when an event such as power on occurs step 450. Thereafter, the second security chip 250 may provide enabling information for one or more components in accordance with the component setting information for the MPCs special die 150 and provide disable information for the remaining components step 452.

Each component of the MPCs special die 150 provided with the enabling information may be enabled and operate to perform its own unique function step 454, and also perform communication with the MPCs common die 100 through the chiplet interface, and each component of the MPCs special die 150 receiving the disable information may be disabled and the operation may be restricted steps 456.

In the example of FIG. 4 above, only enabling/disabling of the corresponding component was disclosed by providing enable/disable information to the component.

Enabling/disabling of the above components provides or blocks a clock to the components, or providing or blocking power to the component, providing or not providing a specific predetermined signal or password to the component, or this can be implemented by activating or deactivating the bus interface for the above component.

In the first preferred embodiment of the present invention, only the security of the MPCs common die 100 and the MPCs special die 150 is disclosed by recording component setting information in the security chip. However, the intellectual property protection performance of the system semiconductor can be improved by allowing the component setting information recorded in the security chip to go through an authentication process, and this will be explained through the second embodiment.

Second Embodiment

Configuration of the Security Chip

Figure 5:
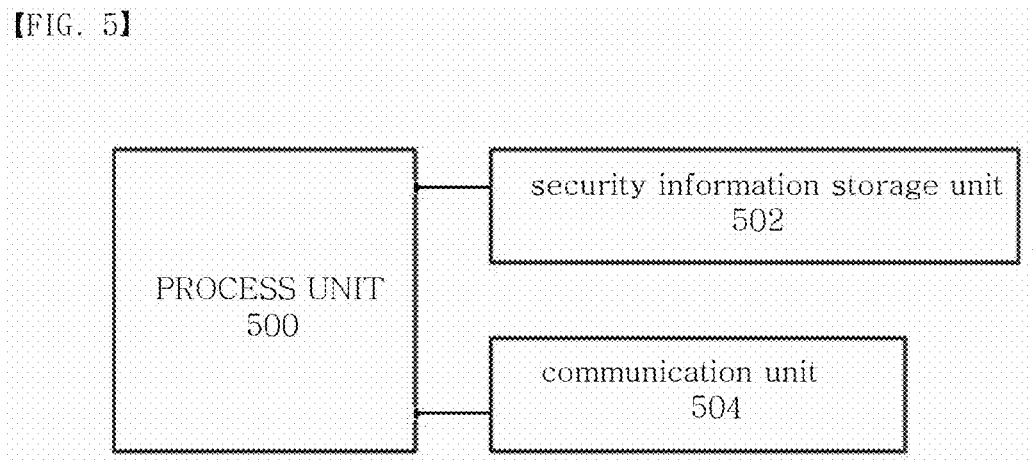
FIG. 5 is a configuration diagram of a security chip according to a second preferred embodiment of the present invention.

FIG. 5 shows the configuration of a security chip according to a second preferred embodiment of the present invention. Referring to FIG. 5, the security chip may include a processing unit 500, a security information storage unit 502, and a communication unit 504.

The process unit 500 may perform a security function in accordance with the preferred second embodiment of the present invention and control each component of the security chip. To further explain the operation of the process unit 500, when authentication information for one or more of the MPCs Common Die and MPCs Special Die is provided from a user, the process unit 500 may perform the authentication process using the provided authentication information. When authentication is performed and authentication is successful, pre-stored component setting information corresponding to the successfully authenticated customer information is read, one or more components corresponding to the read component setting information are enabled, and the remaining components are enabled.

Enabling or disabling the component may include providing or blocking a clock to the component, providing or blocking power to the component, or providing or not providing a specific predetermined signal or password to the component, or enable or disable the bus interface for the above component.

The security information storage unit 502 may store various information such as the processing program of the process unit 500, and in particular, the authentication information and the corresponding component setting information are stored in accordance with the preferred second embodiment of the present invention. The authentication information is information for authentication to the customer, and the component setting information corresponding to the certification information is the identification information for the components for which the use of intellectual property rights has been granted by the authorized customer, and it is the setting information for the components to be enabled and the components to be disabled among the components included in the die in charge.

The communication unit 504 may be responsible for communication or signal processing with the process unit 500 and one or more dies related to the communication unit 504.

Now, the operation method of the system semiconductor applicable to the system semiconductor described above will be explained with reference to the diagram.

Operation Procedure of System Semiconductor

Figure 6:
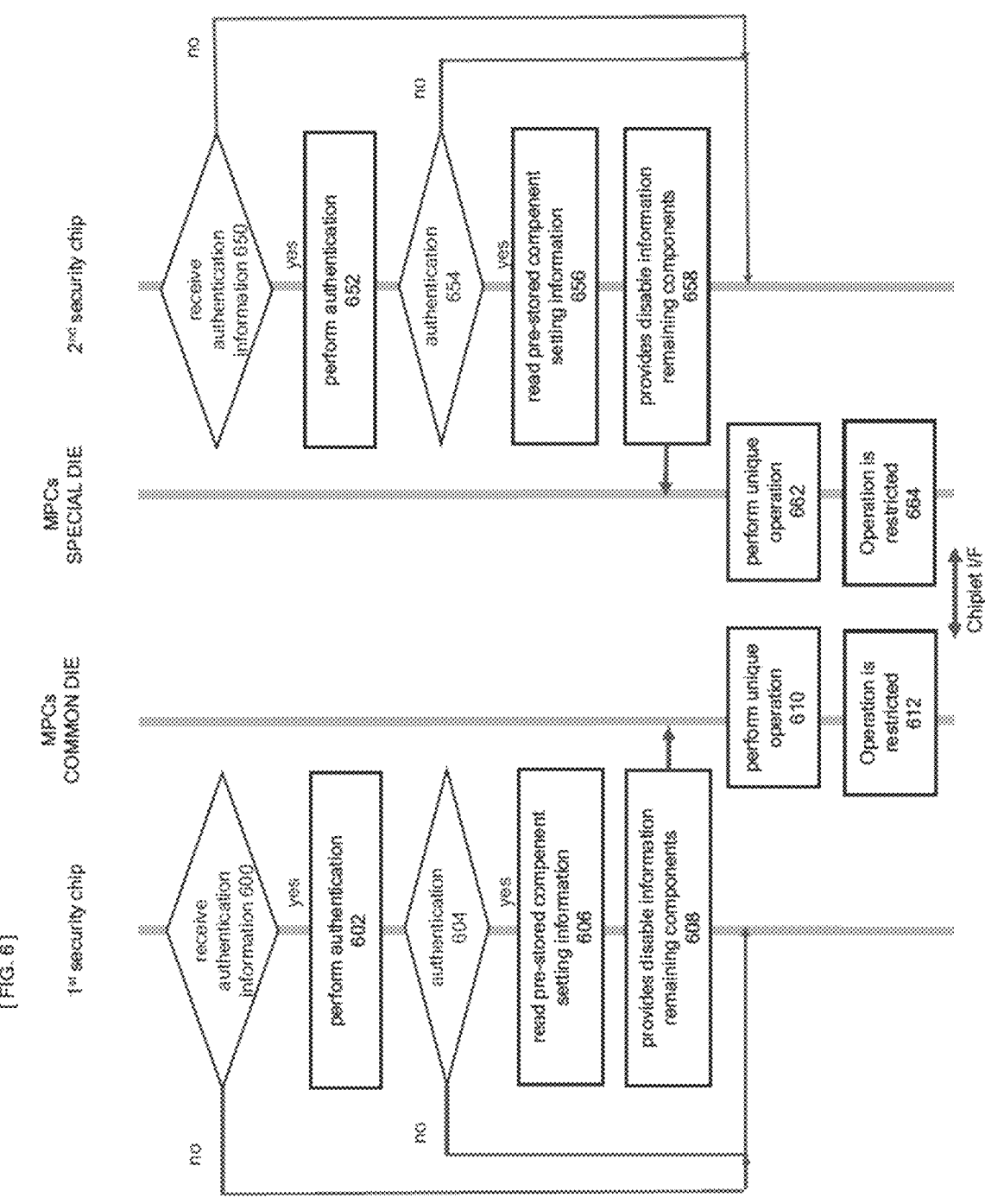
FIG. 6 is a driving procedure diagram of a system semiconductor according to a second embodiment of the present invention.

FIG. 6 shows the driving procedure, i.e., operation procedure, of the system semiconductor according to the second preferred embodiment of the present invention. Referring to FIG. 6, when authentication information is provided from the user after an event such as power on occurs step 600, the first security chip 800 shown in FIG. 7 may perform authentication according to the authentication information step 602.

If the authentication is successful step 604, the first security chip may read pre-stored component setting information corresponding to the successfully authenticated customer information steps 606. Thereafter, the first security chip may provide enable information for one or more components according to the component setting information for the MPCs common die and provides disable information for the remaining components step 608.

Each of the components of the MPCs common die may be enabled and perform the function thereof when the enable information is received from the first security chip 800, and when necessary to perform the unique function of the each of the components of the MPCs common die and the each of the components of the MPCs common die communicates with the components of the MPCs special die through the chiplet interface step 610. And the each component of the MPCs common die may be disabled if disable information is received from the first security chip 800 shown in FIG. 7 and operation is restricted steps 612.

Figure 7:
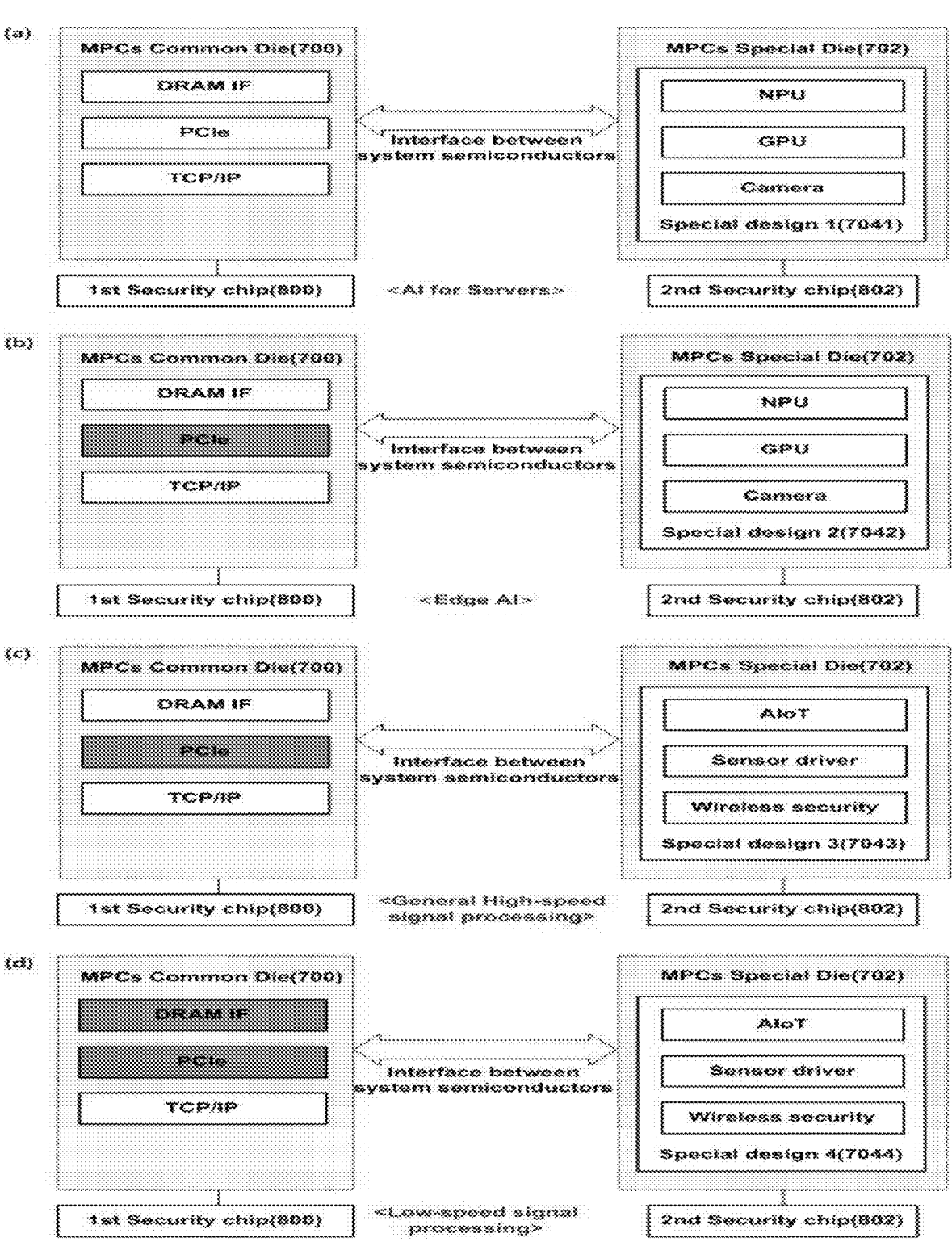
FIG. 7 is a diagram showing an example of an operation of a system semiconductor according to an embodiment of the present invention.

And when the authentication information is provided from the user step 650 after an event such as power on occurs, the second security chip 802 shown in FIG. 7 may perform authentication according to the authentication information step 652.

When the above authentication is successful, the second security chip may read the pre-stored component configuration information corresponding to the user information that has been successfully authenticated step 654,656. Thereafter, the second security chip may provide enabling information for one or more components in accordance with the component setting information for MPCs special dies and provides disable information for the remaining components step 658. Each component of the MPCs special die provided with the enabling information is enabled and operates to perform own unique function thereof, and if it is necessary to perform the unique function of the above enable, the each component of the MPCs special die may perform communication with the components of the MPCs commondie through the chiplet interface step 662, and the each component of the MPCs special die provided with the disable information may be disabled and the operation may be restricted step 664.

In the example of FIG. 6 above, only enabling/disabling of the corresponding component by providing enable/disable information to the component was disclosed.

Enable/disable of such component may be achieved by providing or blocking the clock to the component, providing or disconnecting power to the component, providing or failing to provide a specific predetermined signal or password to the component, or enabling or disabling the bus interface for the component.

By the preferred embodiments of the present invention described above, the system semiconductor is configured with a large number of dies and then operated in accordance with the customer's intellectual property rights license state, which is explained by reference to the example in FIG. 7.

First, Software is run on the CPU of the MPCs common die and the entire system is operated using each IP. The MPCs common die can operate as a system semiconductor by itself, but MPCs special dies may be needed to implement an entire system capable of advanced applications by performing separate special functions.

For example, when implementing artificial intelligence semiconductors, TCP/IP high-speed communication, or AIoT, there are cases where implementation is not possible with MPCs common die alone. In this case, the component blocks required for the above functions can be designed on MPCs special dies, and the entire system can be implemented using a chiplet interface between the system semiconductors.

In this case, the first security chip can control the operation of the software of MPCs common die and the operation of any IP up to each IP (1.1)~(1.N). In addition, the 2nd security chip can selectively determine whether to operate the software of MPCs special dies and whether to operate any design part up to each application design part special design 1~N.

FIG. 7 shows various examples of combining the special design (7041~7043) of MPCs common die 700 and MPCs special die 702.

Various operations are implemented by using the common chip of the MPCs common die 700 and selectively using special designs 1 to 3 (7041 to 7043) of the MPCs special die 702. The following show an example of implementing a semiconductor.

(a) is an example of implementing AI for servers, (b) is an example of implementing edge AI, (c) is an example of implementing a system semiconductor for general high-speed signal processing, and (d) is an example of a system for low-speed signal processing.

Conventionally, in order to construct a system for each of the above examples, it is necessary to use four chips that implement each function. However, in the present invention, (a) to (d) allows the MPCs common die 700 to be used as a common chip, while allowing the special design 1~3 (7041~7043) of the MPCs special die 702 to be used selectively to realize four types of system semiconductors.

Here, the MPCs special die 702 may be optionally equipped with one of the special designs 1~3 (7041~7043) on each chip, or the special design 1~3 (7041~7043) may be integrated and provided.

And the first security chip 800 connected to the MPCs common die 700 is IP 1, 2, . . . . The functions of N can be selected arbitrarily. If a large number of designs of MPCs special die 702 are integrated on a single chip, a second security chip 802 may be used to select each design so that each different function can be implemented.

The embodiments of the present invention described above are disclosed for illustrative purposes only, and a person with ordinary knowledge in the field of description of the present invention may be able to make various modifications, alterations, and additions within the thought and scope of the present invention, and such modifications, alterations, and additions should be regarded as falling within the scope of the present patent claims.

EXPLANATION OF SYMBOLS

100: MPCs Common Die
150: MPCs Special Die
200: 1 security chip
250: 2 security chip

What is claimed is:

1. A system semiconductor, comprising:
a common die with one or more common die components; and a special die with one or more special die components;
a first chiplet interface formed on the common die, which is configured to interface between the one or more common die components and the one or more special die components;
a second chiplet interface formed on the special die, which is configured to interface between the one or more common die components and the one or more special die components; and
a security chip configured to enable one or more common die components and/or one or more special die components and disable remaining common die components and remaining special die components, wherein the security chip performs authentication according to the authentication information when authentication information is provided from a user;
wherein, when authentication is successful, read pre-stored component setting information corresponding to the user, enable one or more components corresponding to read component setting information and disable the remaining components; and
when authentication is not successful, do not read pre-stored component setting information corresponding to the user.

2. The system semiconductor of claim 1, wherein the first chiplet interface and the second chiplet interface are at least any one or more selected from General Purpose Input/Output (GPIO), Serializer/Deserializer(SerDes), Universal Chiplet Interconnect Express (UCIe), Peripheral Component Interconnect Express (PCIe), Universal Serial Bus (USB), IEEE1394, FireWire, and Transmission Control Protocol/Internet Protocol (TCP/IP).

3. The system semiconductor of claim 1, wherein the security chip is configured to enable or disable at least one of the common die components or the special die components,
by providing or blocking clocks to the common die components or the special die components,
by providing or cutting off power to the common die components or the special die components,
by providing or not providing a specific predetermined signal or password to the common die components or the special die components, or
by enabling or disabling bus interfaces for the common die components or the special die components.

4. The system semiconductor of claim 1, wherein the common die components and/or the special die components is implemented as hardware.

5. A method of driving a system semiconductor, wherein the system semiconductor comprises a common die with one or more common die components and a special die with one or more special die components, the method comprising:
interfacing, by a first chiplet interface unit provided in the common die, between the one or more common die components provided in the common die and the one or more special die components provided in the special die;

interfacing, by a second chiplet interface unit provided in the special die, between the one or more special die components provided in the special die and the one or more common die components provided in the common die;

enabling the one or more common die components and the one or more special die components by a security chip formed in the common die and/or special die; and disabling the remaining common die components and the remaining special die components by the security chip formed in the common die and/or special die; and performing authentication by the security chip, according to the authentication information when authentication information is provided from a user, wherein, when authentication is successful, read pre-stored component setting information corresponding to the user, enable one or more components corresponding to read component setting information and disable the remaining components; and when authentication is not successful, do not read pre-stored component setting information corresponding to the user.

6. The method of driving the system semiconductor of claim 5, wherein the first chiplet interface and the second chiplet interface are at least any one or more selected from General Purpose Input/Output (GPIO), Serializer/Deserializer(SerDes), Universal Chiplet Interconnect Express (UCIe), Peripheral Component Interconnect Express (PCIe), Universal Serial Bus (USB), IEEE1394, FireWire, and Transmission Control Protocol/Internet Protocol (TCP/IP).

7. The method of claim 5, wherein the security chip is configured to enable or disable the one or more common die components and/or the one or more special die component by the any one of the following:

by providing or blocking clocks to the common die components or the special die components, by providing or cutting off power to the common die components or the special die components, by providing or not providing a specific predetermined signal or password to the common die components or the special die components, or by enabling or disabling bus interfaces for the common die components or the special die components.

8. The method of claim 5, wherein the common die components and/or the special die components are implemented as hardware.

* * * * *